June 10, 1969  HANS-PETER REERINK  3,448,948
AIRCRAFT SPEED CONTROLLER
Filed June 21, 1967

United States Patent Office 3,448,948
Patented June 10, 1969

3,448,948
AIRCRAFT SPEED CONTROLLER
Hans-Peter Reerink, Meersburg (Bodensee), Germany, assignor to Bodenseewerk Perkin-Elmer & Co., G.m.b.H., Uberlingen (Bodensee), Germany, a corporation of Germany
Filed June 21, 1967, Ser. No. 647,738
Claims priority, application Germany, July 26, 1966, F 49,783
Int. Cl. B64c 13/50, 15/00, 17/00
U.S. Cl. 244—77                    4 Claims

ABSTRACT OF THE DISCLOSURE

Air gust compensation for an aircraft is provided and includes means for generating a signal proportional to the deviation in air speed from a preselected value and for generating a signal proportional to the longitudinal acceleration of the aircraft. These signals are superimposed by circuit means and are transmitted both proportionally and differentially to a thrust control means for controlling the thrust of aircraft propulsive units.

---

This invention relates to a speed controller for aircraft, wherein the fuel supply to the propulsive units is controlled in accordance with the velocity-head. The invention relates more particularly to aircraft of this type wherein means are provided for suppressing the influence of gusts.

Various requirements should be observed when adjusting the speed of the aircraft for the control of the airspeed, in a commercial passenger carrying aircraft. In particular, the fuel supply to the propulsive units shall be subjected to the least possible number of variations. Every variation in the thrust of the propulsive units leads to an undesired noise level variation which is a nuisance and alarms the passengers. In addition, the life of the propulsive unit is reduced if the thrust of the propulsive unit constantly varies within wide limits. When the thrust of the propulsive unit is controlled only in accordance with the velocity-head, then temporary gusts cause a change in the thrust of the propulsive units, which tends to counteract the influence of the gusts. As a result, in rough weather flight, the propulsive units are constantly and alternatingly being heavily throttled or heavily loaded.

In prior art speed controllers, an attempt has been made to avoid these difficulties by providing that a signal from a velocity-head indicator is supplied to the speed controller through filters which filter out only temporary signal variations. However, such a signal filtering or gust filter introduces different problems. In the speed control (flight control) for aircraft, a highly inert control system is involved. The control system has a relatively long time lag. It requires a relatively long period of time before a change in the capacity of the propulsive units results in a change in the speed and therewith in the velocity-head. The use of a filter in the signal channel for suppressing temporary signal variations, and thus velocity-head variations, however, introduces an additional time lag. On the contrary, provision should be made to counteract the inertia of the control system by a lead control.

For these reasons, speed controllers which operate satisfactorily in gusty weather have not been provided.

On the other hand, the requirements for bad-weather landing make the use of a satisfactorily operating speed controller almost a necessity. This applies more so in automatic landing control for which it is a prerequisite that the aircraft speed be reduced and controlled. In this instance, similar to a normal landing approach, it is to be observed that the critical air speed which is dependent on the position of the landing flaps (stall speed plus safety allowances) is not exceeded. When cruising at high altitude, the speed controller can ensure that on the one hand the sound limit is not reached, and on the other hand, the critical speed at which the lift is not sufficient anymore to sustain the aircraft in flight, is not exceeded.

Accordingly, it is an object of the present invention to provide an improved form of airspeed controller for aircraft.

It is another object of this invention to provide a speed controller for aircraft wherein the influence of gusts is suppressed, without an additional time lag thereby occuring in the control loop, which, however, quickly and effectively suppresses all other disturbances.

In accordance with features of the present invention, a signal derived from a longtiudinal accelerometer is superimposed on a signal formed by the velocity-head signal and the time derivative thereof, and substantially proportional to the true deviation of the speed relative to air from a control setpoint value for gust compensation.

The invention can be appreciated from the following considerations. At constant speed of the aircraft relative to the ambient air, a specific thrust of the propulsive units is established at which aerodynamic drag is counterbalanced. If, for instance, a headwind gust occurs, this equilibrium will be disturbed. The thrust remains constant and the speed of the aircraft relative to air is increased by the gust and therewith the aerodynamic drag. Consequently, the aerodynamic drag is predominant and the aircraft is retarded relative to ground. This retardation can be measured with a longitudinal accelerometer. However, when a tailwind gust occurs, the speed of the aircraft relative to air will be reduced with respect to the state of equilibrium. The air flows along with the aircraft and the aerodynamic drag decreases so that the thrust of the propulsive units is predominant and the aircraft is accelerated relative to ground. Thus, an increase ($\Delta v$) in the speed of the aircraft relative to air due to gusts is accompanied by a retardation ($-b$) relative to ground and a reduction in the speed ($\Delta v$) relative to air is accompanied by an acceleration ($+b$) relative to ground.

In contrast however, conditions are different if the change in speed is caused by factors other than wind gusts, as for example, the failure of a propulsive unit or, to the fact that the propulsive units do not operate with the capacity corresponding to a setpoint speed. In such a case, a reduction in the speed relative to air is accompanied by a retardation relative to ground, and an increase in the speed relative to air is accompanied by an acceleration relative to ground. Thus, in this case, the speed signal and the signal from the accelerometer act in the same sense. If therefore, a speed signal and a signal derived from the accelerometer are superimposed additively, it can be provided that the signals produced in the presence of gusts compensate each other, whereas, for other causes of speed variations, these signals act in the same sense. Thus, a suppression of the influence of gusts of any length of time is obtained and a smooth and uniform operation of the propulsive units is ensured. This is accomplished without an additional time lag in the control loop as in the prior art speed controllers, while, for all other disturbances a quick control is effected. The speed signal as it is commonly derived from a velocity-head indicator is in practice, however, subjected to delay due to play, gear backlash and frictions. A good, almost "ideal" speed signal as required for the compensation of gusts, can be formed by additively superimposing on the speed deviation signal ($\Delta v$) derived from the velocity-head indicator, a preferably slightly delayed differentiated ($\dot{\Delta v}$) signal.

The invention may be realized in one arrangement by providing electrical signals representative of the deviation of the speed relative to air from a control setpoint value and the longitudinal acceleration of the aircraft. These signals are employed as input signals of the controller and are transmitted and superimposed, once proportionally and again differentially, and the sum signal thus obtained controls a servomotor without position repeatback for the adjustment of the fuel supply.

A change ($\Delta v$) in the speed of the aircraft relative to air which deviates from the control setpoint value at which an equilibrium between thrust and aerodynamic drag exists, and when due to a gust is effective to cause a resultant force $P \sim (\Delta v)$ on the aircraft and a corresponding acceleration ($b$) relative to ground. The sign of ($b$) is opposed to that of ($\Delta v$). Thus, when the signal ($\Delta v$) and ($b$) improved in the described manner has superimposed thereon suitable weights which depend, for instance, on mass and resistance factor of the aircaraft, the influence of gusts can be compensated.

The servomotor without position repeatback, preferably, however, with a speed feedback, represents an integrating element. It has the advantage that play which commonly exists in the adjusting mechanism, has no detrimental influence on the control. When the error ($\Delta v$) of the speed relative to air is applied to the servomotor, this results in a I-portion of the speed control. The differentiated ($\Delta v$) signal—apart from the problem of correcting the ($\Delta v$) signal derived from the velocity-head indicator —together with the proportionally transmitted acceleration signal results in a P-portion of the speed control. Finally, in addition to that, a path of adjustment of the servomotor, corresponding to the change in speed is obtained from the differential acceleration which is again integrated by the servomotor and supplies a D-portion for the speed control.

Thus, in the arrangement as herein described, the use of the acceleration signal as input to the controller, apart from the error ($\Delta v$) of the speed relative to air, in addition to the gust compensation, results in the further advantage that a PID-controller is obtained, without the velocity-head signal ($\Delta v$) having to be differentiated more than once. This would lead to an intolerable increase in the noise level. On the contrary, it is even possible to use an integrating final control element (motor without position repeatback) and control the same with a signal proportional to the second derivative of the speed.

The invention may be realized in one arrangement by additively superimposing the input signals and the signal thus obtained by superimposition is transmitted in a channel each proportionally and differentially, and at the sum of the signals thus transmitted controls the servomotor. An arrangement of the type indicated operates with a minimum display of amplifiers.

However, in this arrangement the ($\Delta v$) and the acceleration signals are transmitted conjointly both in the proportional channel and in the differentiating channel. Coefficients of the individual terms of the sum in the linear combination therefore have a specific ratio and can therefore be freely adjusted only within specific limits, which is however sufficient for a plurality of technical requirements. For the adaption to the performance of the aircraft it is desirable to further obtain an additional adjusting parameter. The arrangement is therefore provided such that each of the two input signals is transmitted in two channels, once proportionally and again differentially and the four signals thus obtained, superimposed additively, control the servomotor.

These and other objects and features of the invention will be apparent with reference to the specification and drawings wherein.

Figure 1:
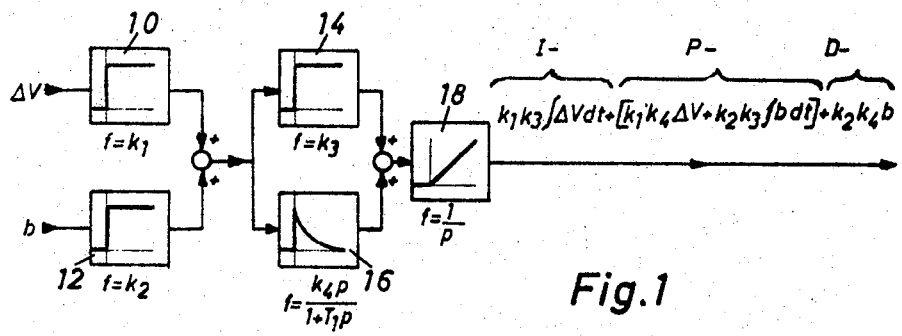
FIGURE 1 illustrates an embodiment of a speed controller wherein the input signals deviation of speed $\Delta v$ and acceleration ($b$) are first superimposed and the signals thus superimposed are transmitted in a common channel proportionally and in a further common channel differentially.

In the embodied form according to FIGURE 1 there are two input signals $\Delta v$ and ($b$). The signal $\Delta v$ represents the deviation of the speed relative to air from a setpoint value. It may be supplied by a velocity-head indicator. The signal ($b$) is the acceleration relative to ground in a longitudinal direction of the aircraft, which is determined with an accelerometer. In the accelerometer the gravity acceleration may be compensated in a manner known per se by a signal obtained from the vertical gyro. The two signals $\Delta v$ and ($b$) are transmitted proportionally and superimposed additively via amplifiers 10 and 12 with the factors $k_1$ and $k_2$, respectively. The sum signal thus obtained $k_1 \Delta v + k_2 b$ is transmitted proportionally in a first channel 14 with a factor $k_3$. In a second channel 16 there is effected a delayed differentiation of the signal with a transfer function $$F = \frac{k_4 P}{1 + T_1 P}$$

The output signals obtained in the two channels are again superimposed and control a servomotor 18 without position repeatback, which is an integrating element and adjusts the gas throttle of the aircraft. The path of adjustment $y$ of the gas throttle therefore results in $$y = k_1 k_3 \int \Delta v \, dt + [k_1 k_4 \Delta v \, k_2 k_3 \int b \, dt] + k_2 k_4 b$$

For the speed control the first term of the sum therefore results in an I-portion. The term in parenthesis supplies the P-portion and the final term supplies a D-portion so that the controller operates with lead and allows for the great inertia of the control system. At the same time, when suitably selecting the coefficients $k_1$ to $k_4$ the requirements of gust compensation as described in the beginning are fulfilled.

Figure 2:
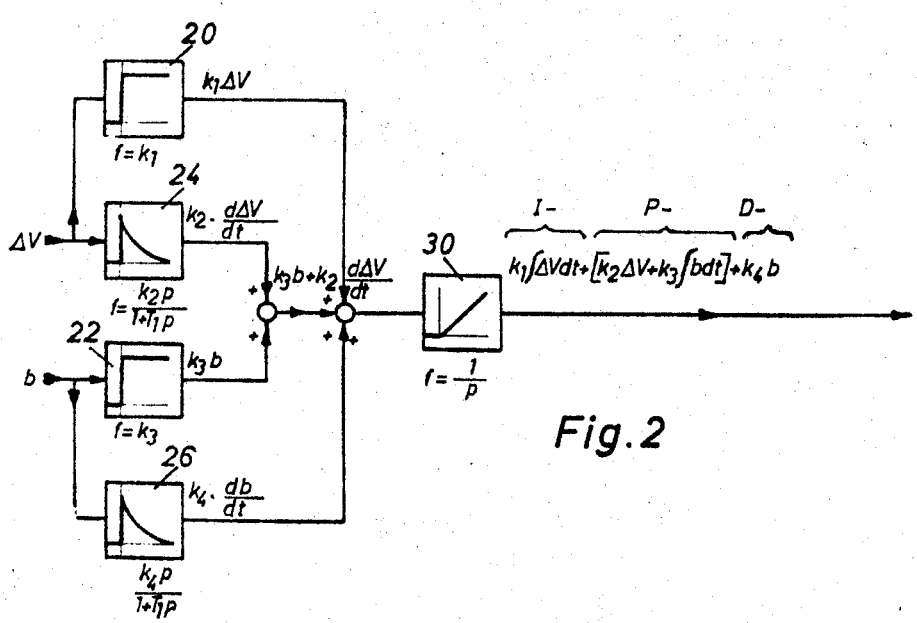
FIGURE 2 illustrates a speed controller with one channel each transmitting proportionally and one transmitting differentially for each of the two input signals.

According to FIGURE 2 there are provided separate proportionally and differentially transmitting channels 20 and 22, and 24 and 26, respectively, for the two input signals $\Delta v$ and $b$. The output signals of the channels 20 to 26 are superimposed additively and control the gas throttle-servomotor 30. Also this controller acts as a PID-controller. By a suitable selection of the coefficients $k_1$ to $k_4$ it can herein be achieved in still wider limits and more various cases of application that gusts do not execute an influence on the gas throttling in accordance with the compensation method as herein described.

In practice, the adjustment is effected empirically since it is dependent on the flight properties of the aircraft. The value $\Delta v$ may be formed as a difference of a speed signal derived from a velocity-head indicator and of the signal from a setpoint value transmitter. Therein, during landing, the setpoint value transmitter may, for instance, be adjusted in dependence on the adjustment of the landing flaps so that the speed is reduced in a defined and controlled manner from the cruising speed to the landing speed at which the aircraft touches the ground.

While there has been illustrated and described particular embodiments of my invention, it will be understood that various modifications may be made therein without departing from the spirit of the invention and the scope of the appended claims.

What I claim is:

1. A gust compensated speed controller for an aircraft having propulsive units and a fuel supply therefor comprising:

thrust control means responsive to an electrical input signal for varying the fuel flow rate to a propulsive unit to control the thrust thereof;

means providing an electrical signal proportional to the variation in aircraft speed from a preselected value;

means providing an electrical signal proportional to the longitudinal acceleration of the aircraft; and circuit means for superimposing and transmitting the signals proportionally and differentially, and for applying the resultant signal to said thrust control means.

2. The speed controller of claim 1 wherein said circuit means are adapted for superimposing the signals additively.

3. The speed controller of claim 2 wherein said circuit means is adapted for transmitting the superimposed signal in a first channel proportionally and in a second channel differentially, and for applying the sum of the transmitted signals to the thrust control means.

4. The speed controller of claim 1 wherein said circuit means include first and second channels, each for transmitting an input signal differentially and proportionally and for superimposing and applying the output signals of these to the thrust control means, and said signals are applied to the first and second channels respectively.

References Cited

UNITED STATES PATENTS

| | | | |
|---|---|---|---|
| 2,948,496 | 8/1960 | Joline | 244—77 |
| 3,030,053 | 4/1962 | Smith et al. | 244—77 |

FERGUS S. MIDDLETON, *Primary Examiner.*

U.S. Cl. X.R.

318—489